(12) United States Patent
Vella

(10) Patent No.: US 6,701,332 B1
(45) Date of Patent: Mar. 2, 2004

(54) CLUSTER FILE SYSTEM MULTI-VOLUME ROOT SUPPORT

(75) Inventor: Maria DiCenso Vella, North Reading, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 418 days.

(21) Appl. No.: 09/629,066

(22) Filed: Jul. 31, 2000

(51) Int. Cl.[7] .............................................. G06F 12/00
(52) U.S. Cl. ........................ 707/204; 707/200; 707/10; 711/171
(58) Field of Search .............................. 707/1–10, 200, 707/204; 711/171; 713/177–183

(56) References Cited

U.S. PATENT DOCUMENTS

| | | | |
|---|---|---|---|
| 4,941,059 A | | 7/1990 | Grant .......................... 360/72.2 |
| 5,706,472 A | * | 1/1998 | Ruff et al. ................... 711/173 |
| 5,742,818 A | * | 4/1998 | Shoroff et al. .............. 707/200 |
| 5,835,094 A | | 11/1998 | Ermel et al. ................. 345/355 |
| 5,924,122 A | | 7/1999 | Cardoza et al. ............. 711/150 |
| 5,974,250 A | | 10/1999 | Angelo et al. | 
| 6,052,134 A | | 4/2000 | Foster ......................... 345/521 |
| 6,052,764 A | | 4/2000 | Mogul ......................... 711/162 |
| 6,067,604 A | | 5/2000 | Ramachandran et al. ... 711/149 |
| 6,101,508 A | * | 8/2000 | Wolff .......................... 707/218 |
| 6,119,131 A | * | 9/2000 | Cabrera et al. ............. 707/203 |
| 6,173,291 B1 | * | 1/2001 | Jenevein ..................... 707/200 |
| 6,374,265 B1 | * | 4/2002 | Chen et al. ................. 707/204 |
| 6,377,958 B1 | * | 4/2002 | Orcutt ......................... 707/200 |
| 6,421,711 B1 | * | 7/2002 | Blumenau et al. .......... 709/213 |
| 6,438,705 B1 | * | 8/2002 | Chao et al. ..................... 714/4 |
| 6,591,356 B2 | * | 7/2003 | McMurdie et al. ......... 707/205 |
| 6,615,365 B1 | * | 9/2003 | Jenevein et al. ............ 711/161 |

OTHER PUBLICATIONS

"Implementing Global Memory Management in a Workstation Cluster"—Michael J. Feeley, William E. Morgan, Frederic H. Pighin, Anna R. Karlin and Henry M. Levy—SIGOPS Dec. 1995 ACM, (pps: 201–201).*

* cited by examiner

*Primary Examiner*—Kim Vu
*Assistant Examiner*—Anh Ly (57) ABSTRACT

A method for supporting multi-volume roots in a cluster file system. The method comprises maintaining a list of storage volumes containing the cluster root file system in a list partition of a boot disk for each cluster node; modifying the cluster root file system storage; and updating each list of storage volumes in the cluster file system to reflect the modification.

33 Claims, 5 Drawing Sheets

FIG. 8

CLUSTER FILE SYSTEM MULTI-VOLUME ROOT SUPPORT

BACKGROUND OF THE INVENTION

1. Field of the Invention

The present invention pertains to file systems in a computing environment and, more particularly, to a technique for multi-volume root support in such an environment.

2. Description of the Related Art

As information technology has matured, computing systems have evolved into what are now known as "enterprise computing systems." An enterprise computing system is typically a large number of computing and storage devices, all of which are employed by users from a single concern, or "enterprise." One popular type of enterprise computing system is an "intranet," which is a computing system that operates like the Internet, but requires special authorization to access. Such access is typically only granted to employees and/or contractors of the enterprise. However, not all enterprise computing systems are intranets or operate along the principles of the Internet.

Another common characteristic of enterprise computing systems is that they may be conceptualized as groups, or "clusters," of constituent computing systems. In an enterprise computing system, the number of users is typically so large that several, sometimes dozens or hundreds, of servers are necessary to manage all the computing resources of the system. These computing resources are grouped into clusters. Each cluster has at least one server that administers the cluster's computing resources. While a cluster of constituent computing systems might include numerous servers, typically only one will administer the cluster's computing resources across the whole cluster. Some enterprise computing systems might also have a "master" server that controls operations across the entire computing system.

Frequently, a computing system's architects imbue the system with "single system semantics." This means that, ideally, the system structure is transparent to the user so that the user is completely unaware they are working in any particular system or cluster, or even that the overall system is grouped into clustered systems. All the users will know is that they are interfaced with a system of computing resources at their disposal. The computing system handles the users instructions in a manner without any specific input from the user as to where the resources necessary to complete the task may be found in the system.

One important component in these respects is the "file system." In this context, "files" constitute data stored in a predefined format, structure, or model. A file system ("FS") usually organizes data into various files and manages their location, storage, and access. A FS typically consists of several levels, or "layers," of abstraction. For instance, a FS will include a physical file system as a "bottom" layer, which is the actual physical file system in which the FS stores the data on a disk. Additional layers are also traditionally used.

One feature found in a clustered enterprise computing system is a "distributed file system." A distributed file system ("DFS") is simply a FS in which the various files that may be accessed may be shared simultaneously by the other computing resources. Thus, multiple users can use the data at the same time. Files in a DFS may be distributed across the entire computing system, i.e., various part of the physical file system are located in different part of the computing system. More commonly, however, files are grouped and segregated into the clusters into which the rest of the computing resources are grouped. However, even though the files in the physical file system may be segregated into a cluster, they are still distributed across various computing resources in the cluster. Such a cluster-wide DFS shall, for present purposes, be referred to as a cluster FS ("CFS").

Thus, one or more of the computing resources in a cluster will usually be running an "application" at any given time. The application(s) operate(s) on the data in the files of the CFS. The CFS manages the reading and writing of data between the computing resources and the cache and between the cache and the disk storage. Applications may also sometimes reach beyond their cluster into the CFS of another cluster, which is also handled by the CFS. The grouping of files into a particular CFS is generally predicated on the commonality of their use by application(s) running in a cluster. One function of the CFS is to provide a common address space for the distributed elements of the physical file system, i.e., to provide an intermediary so that the application need only employ a single address that the CFS then translates to a location in the physical file system.

One important aspect to managing an enterprise computing system is adding storage and or computing capacity, and it implicates both the physical file system and the CFS. For instance, if a new logical storage unit is added, or an old logical storage unit is removed, the modification to the cluster needs to be propagate through the various layers of the file system. One way to address this issue is to treat each logical storage unit as a "storage volume." Each storage volume containing a particular file system is "mounted" on a node of the cluster. New storage volumes cannot be added to the root file system, i.e., all root file systems are contained on a single storage volume. Regardless of the manner in which new storage volumes are introduced into the file system, it is important from a management standpoint because of its effect on the efficiency of the computing system's operation.

The present invention is directed to resolving, or at least reducing, one or all of the problems mentioned above.

SUMMARY OF THE INVENTION

The present is, in one aspect, a method for supporting multi-volume storage in a cluster root file system. The method comprises maintaining a list of storage volumes containing the cluster root file system in a list partition of a boot disk for each cluster node; modifying the cluster root file system storage; and updating each list of storage volumes containing the cluster root file system to reflect the modification.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
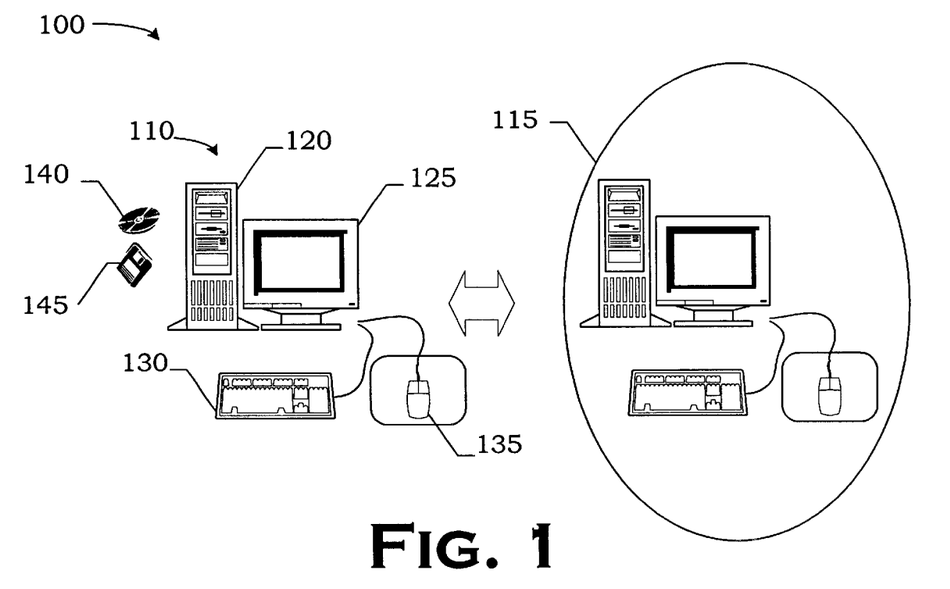
FIG. 1 depicts a non-cluster node and a clustered computing system on which the current invention may be employed.

Turning now to the drawings, FIG. 1 conceptually illustrates a computing system 100 configured and operated in accordance with the present invention. In one particular embodiment, the computing system 100 is an enterprise computing system, but this is not necessary to the practice of the invention. However, the present invention is for use in clustered computing systems and such systems are usually large. Thus, the computing system 100 will typically be of significant size. One exception to this general rule may be found in the construction of a large, clustered computing system beginning with a single node. The present invention may be employed to mount a root file system from a storage volume on a cluster node and then iterated to propagate a multi-volume root FS as storage capacity is added to the clustered computing system or as there is a need for the FS to grow in capacity.

The computing system 100 comprises a non-cluster node 110. The non-cluster node 110 is a "non-cluster" node because it is not currently clustered with any other computing resources 115 and is not executing the cluster OS in accordance with the present invention. As will be appreciated by those in the art, a node may be any computing device employing a processor, e.g., a microprocessor, to execute programmed tasks. A node may even be another computing system instead of a single computing device. In the illustrated embodiment, the non-cluster node 110 is implemented in a server 120, but this is not necessary to the practice of the invention. The non-cluster node 110 may, in alternative embodiments, be implemented in, e.g., some type of computer. The non-cluster node 110 also includes a monitor 125, a keyboard 130, and a mouse 135 through which a user (not shown) may interact with the non-cluster node 110. Again, this is not necessary to the practice of the invention. The non-cluster node 110 may operate in accordance with any suitable operating system ("OS"), or kernel, known to the art and modified as disclosed below. Thus, the OS may be disk-operating system ("DOS"), Windows, or UNIX-based. Note, however, that the operating system must be capable of supporting multiple storage volumes for file systems.

Figure 2:
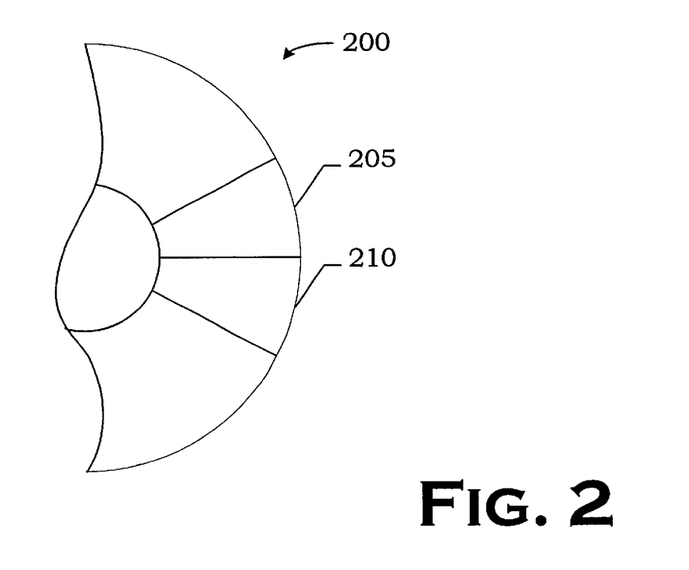
FIG. 2 conceptually depicts a boot partition as may be found on both the non-cluster node and the cluster nodes of the computing system of FIG. 1 and a list partition on a boot disk as may be found on cluster nodes employing the present invention.

The server 120 houses a "boot disk" 200, conceptually illustrated in FIG. 2, that includes a boot partition 205. The boot disk 200 is designated as such because it contains the boot partition 205, which is described further below. For present purposes, the boot partition 205 is a logical partition on the boot disk 200 and is designated such because it contains files used in booting the server 120. Once the server 120 becomes a cluster node, it will be configured with and utilize a list partition 210. The list partition 210 is also a logical partition on the boot disk 200 and stores a list of storage volumes containing the cluster root file system. A separate boot disk 200 containing a list partition 210 exists for each cluster node in the cluster. As those in the art having the benefit of this disclosure will appreciate, many computing devices in a computing system will include multiple disks. Any disk in a given computing device may be designated the "boot" disk. Note that the boot disk 200 may include additional logical partitions that are not "boot partitions" that may be used for purposes other than booting the server 120. For instance, in one implementation of the invention, an additional logical partition is used to house the storage volume information for the cluster root file system.

Figure 3:
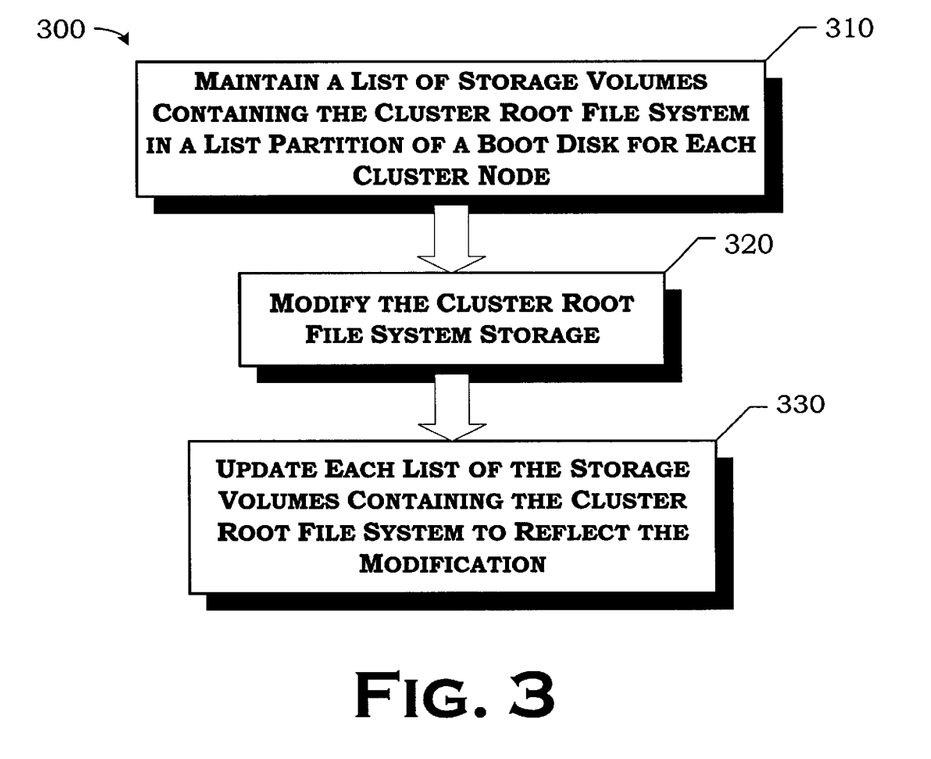
FIG. 3 illustrates a method practiced on a clustered computing system, such as the one in FIG. 1, in accordance with the present invention.

FIG. 3 illustrates a method 300 for supporting multi-volume roots in a cluster file system practiced in accordance with the present invention. The method 300 contemplates application on a clustered computing system, e.g., the clustered computing system 115 in FIG. 1, in which each cluster node includes a boot disk like the boot disk 200 in FIG. 2. Thus, each node includes a boot partition on a boot disk, like the boot partition 205. The method 300 comprises first maintaining a list of storage volumes containing the cluster root file system in the list partition 210 of the boot disk 200 for each cluster node in the cluster, as set forth in the box 310. The method 300 then proceeds by modifying the cluster root file system storage, as set forth in the box 320. The modification may be either the addition or the removal of a storage volume from the cluster root file system. Next, the method 300 updates each of the lists of storage volumes stored in the list partition 210 of the boot disk 200 to reflect the modification, as set forth in the box 330. This method has numerous embodiments and implementations as set forth below that provide a variety of advantages over the state of the art.

As may be apparent from the discussion of FIG. 3, some aspects of the present inventions are software implemented. This software implementation may be manifested as instructions encoded on a program storage medium that, when executed by a computer, perform some particular embodiment of the method in FIG. 3. The program storage medium may be optical, such as the optical disk 140, in FIG. 1, or magnetic, such as the floppy disk 145 in FIG. 1 or the boot disk 200 in FIG. 2. The software implementation may also be manifested as a programmed computing device, such as the server 120 in FIG. 1, programmed to perform some particular embodiment of the method in FIG. 3.

Consequently, some portions of the detailed descriptions herein are presented in terms of a software implemented process involving symbolic representations of operations on data bits within a computer memory. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

To further an understanding of the present invention, one particular embodiment of the invention shall now be disclosed. In this embodiment, one implementation of the method 300 is first used to mount a cluster root file system on the formation of a cluster and then to propagate the cluster root file system storage modifications to all nodes in the cluster. This implementation also employs one variation of the method 300 to remove storage volumes from the cluster root file system. This particular embodiment also employs a sequence number mechanism that is useful in detecting node and/or cluster failures during operations to add or remove new storage volumes from the cluster root files system. Note, however, that not all details of the implementation have been expressly set forth in order not to obscure the invention. For instance, the technique described below assumes that a portion of the cluster OS known as the "connection manager" is able to obtain a "quorum" of the nodes in the cluster. This detail would readily be appreciated by those ordinarily skilled in the art having the benefit of this disclosure, and so is not described in further detail.

Figure 4:
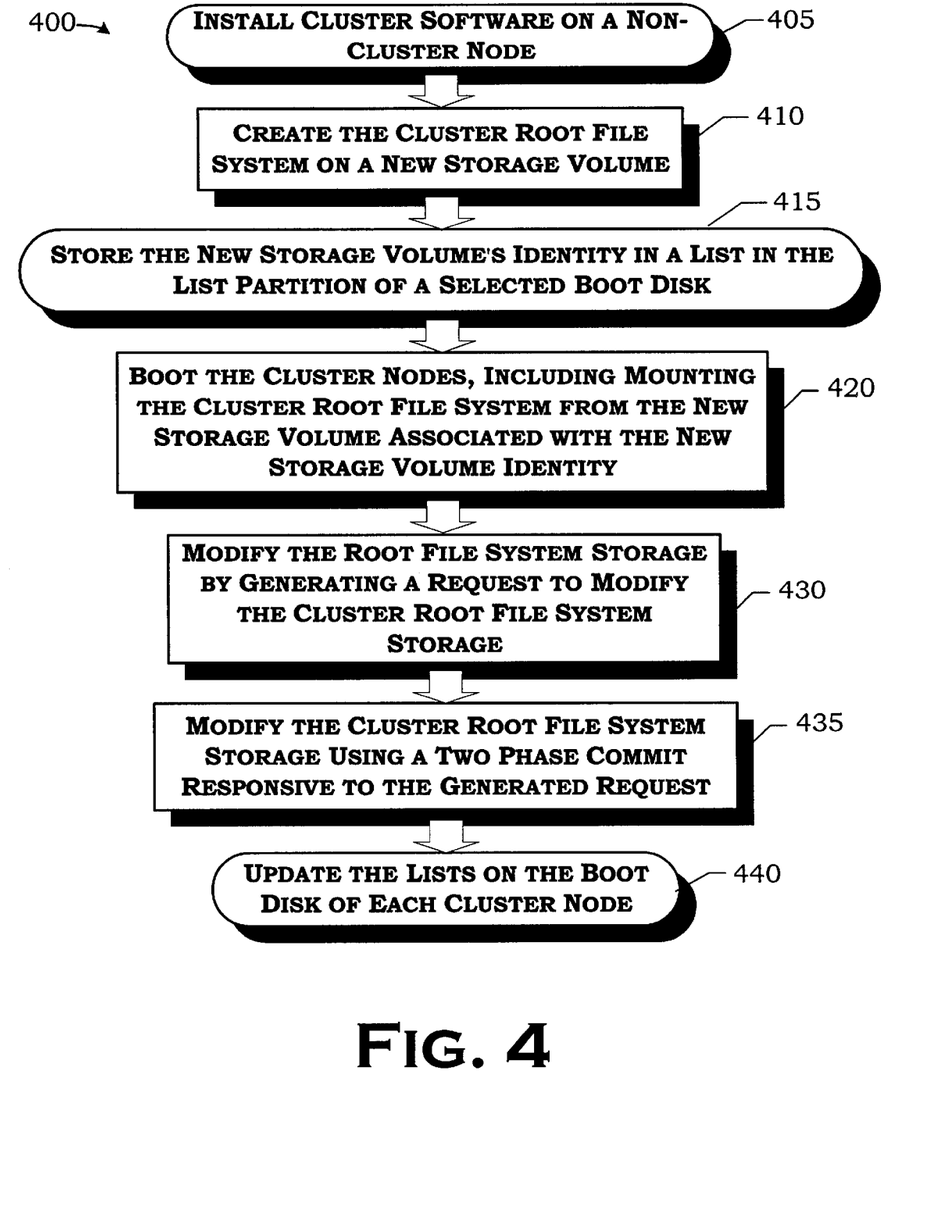
FIG. 4 illustrates one particular implementation of the embodiment in FIG. 3.

FIG. 4 illustrates this one particular embodiment 400 of the method 300 in FIG. 3. this particular embodiment is the creation of an initial node in the cluster. Generally speaking, this particular embodiment involves booting a non-cluster node. The non-cluster node will boot on the OS installed by the original equipment manufacturer ("OEM"). The new cluster OS implementing the present invention is then copied into the boot sector of a new boot disk designated as the boot disk for the node participating as a cluster member, e.g., the boot sector 205 of the boot disk 200. The node is then re-booted using the cluster OS stored in the boot sector, and the initial cluster node is up.

Figure 5:
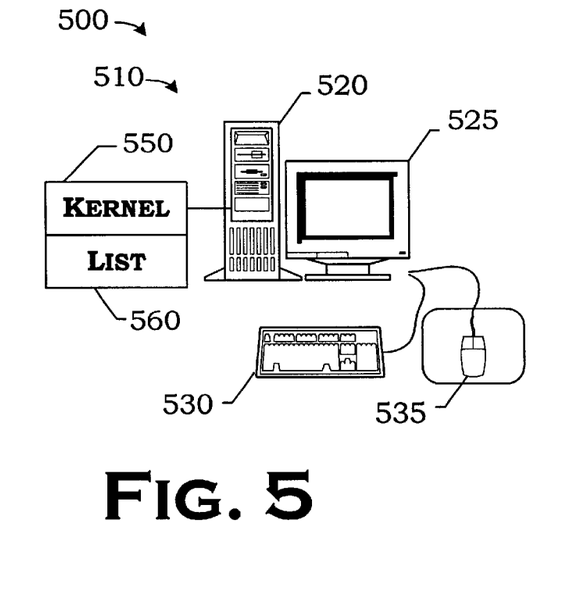
FIG. 5 and FIG. 6 depict a non-cluster node and boot disk on which the cluster root file system storage volumes will be placed.
Figure 6:
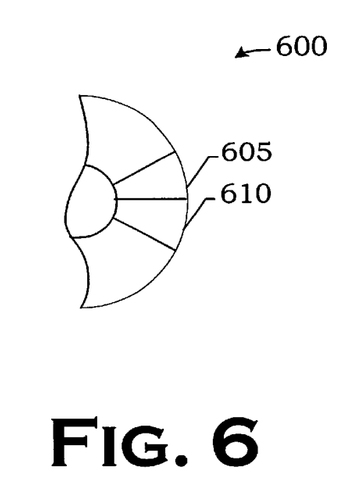

More particularly, the method 400 begins by installing the cluster software on a non-cluster node 500, as set forth in the terminator 405 of FIG. 4, on the non-cluster node 500 of FIG. 5, whose boot disk 600 is shown in FIG. 6. As part of the installation an administrator selects the initial storage element, i.e., the initial storage volume, for the cluster root file system. The cluster software is stored in the boot partition 605 of the boot disk 600. The cluster root file system is then created on the initial storage element, as set forth in the box 410, and the storage volume identity is stored in the list partition 610 of the boot disk 600, as set forth in the box 415. This may be done in any suitable manner. Note that, since the non-cluster node 500 is to be booted as the first node in the cluster, this new storage volume identity constitutes the entirety of the list 560 of the cluster root file system.

In this particular embodiment, the identity copied into the list partition 610 of the boot disk 600 includes a numeric identifier for the storage entity on which the cluster root file system is contained and a sequence number, whose use will be discussed further below. This particular embodiment employs the Advanced File System ("AdvFS"), a part of the UNIX-based OS manufactured and commercially available from Compaq Computer Corporation called the Tru64 UNIX OS. Thus, the numeric identifier in this particular embodiment is the dev_t of the storage entity. The dev_t is simply a numeric representation understood internally to represent the storage entity. The sequence number is a simple numeric value. Thus, storing the new storage volume identity includes, in this embodiment, writing the numeric identifier and the sequence number to the list partition 610 of the boot disk 600 of the node 500

Next, the cluster node 500 is booted and the cluster root file system is mounted from the new storage volume, as set forth in the box 420. In this particular embodiment, this begins with loading and beginning to execute the kernel 550. The kernel 550 resides on the server 520, and its storage, load, and start is performed in accordance with conventional practice. However, as a part of its execution, the kernel is directed, contrary to conventional practice, to the list partition 610 on the booting node's boot disk 600. The kernel 550 then passes the numeric identifier of the initial storage element to the underlying physical file layer. The physical file layer then mounts the root file system contained in the storage entity represented by the numerical identifier. At this point in the process, the node 500 is now the server of the of the cluster root file system, and the cluster is "up" using only the single storage volume for the cluster root file system. Note that the node 500 is a "cluster node" upon boot.

Note that, in some implementations, it is possible that more than one node such as the node 500 might be booted at approximately the same time without the cluster root file system being mounted. Typically, this happens at cluster formation. In this circumstance, the nodes will bid to serve/mount the cluster root file system, as is done in the single node case. Each bid will include the sequence number for the cluster root storage data on the node's list partition on its boot disk. The bid with the highest sequence number wins the right to mount/serve the cluster root file system. (The manner in which the value of the sequence number is adjusted is explained further below.) This ensures that the list of storage elements used to mount the cluster root file system comes from the node(s) whose list partition on their boot disk has the highest sequence number.

Once the cluster node 500 is up, the capability for supporting multi-volume cluster root file system storage is enabled. This capability includes the ability to both add and remove storage volumes to and from the cluster root file system. As those in the art will appreciate, computing systems of this type usually include some degree of replication among the various nodes. In the present embodiment of this invention, as was stated above, each cluster node is aware of all the others. Each node includes a list partition, such as the list partition 610, on their boot disk in which the numeric identifier for the storage volumes of the cluster root file system for the cluster is listed.

Thus, the boot partition of any non-cluster node may be populated with this list from any cluster node in the cluster before or when it is booted into the cluster. A similar problem is encountered when a cluster root storage volume is removed or added—the lists must be updated to reflect the removal. The present embodiment does this in a two-phase commit, as discussed further below, employing the sequence number mechanism previously mentioned. This two-phase commit permits the CFS to detect whether there was a root file system server node failure during the add or remove operation for the cluster root file system.

Figure 7:
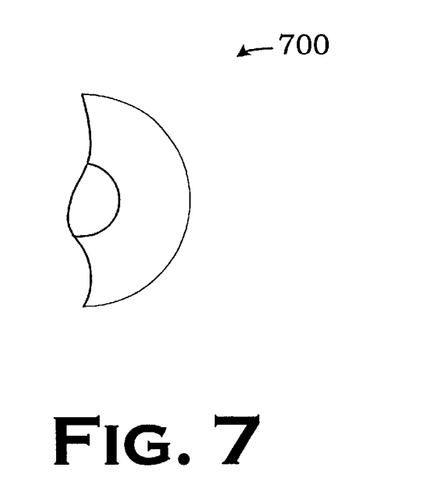
FIG. 7 and FIG. 8 conceptually depicts the addition of a volume to a cluster root file system, with FIG. 8 illustrating a two-phase commit used in adding or removing a storage volume to a cluster root file system of a clustered computing system.
Figure 8:
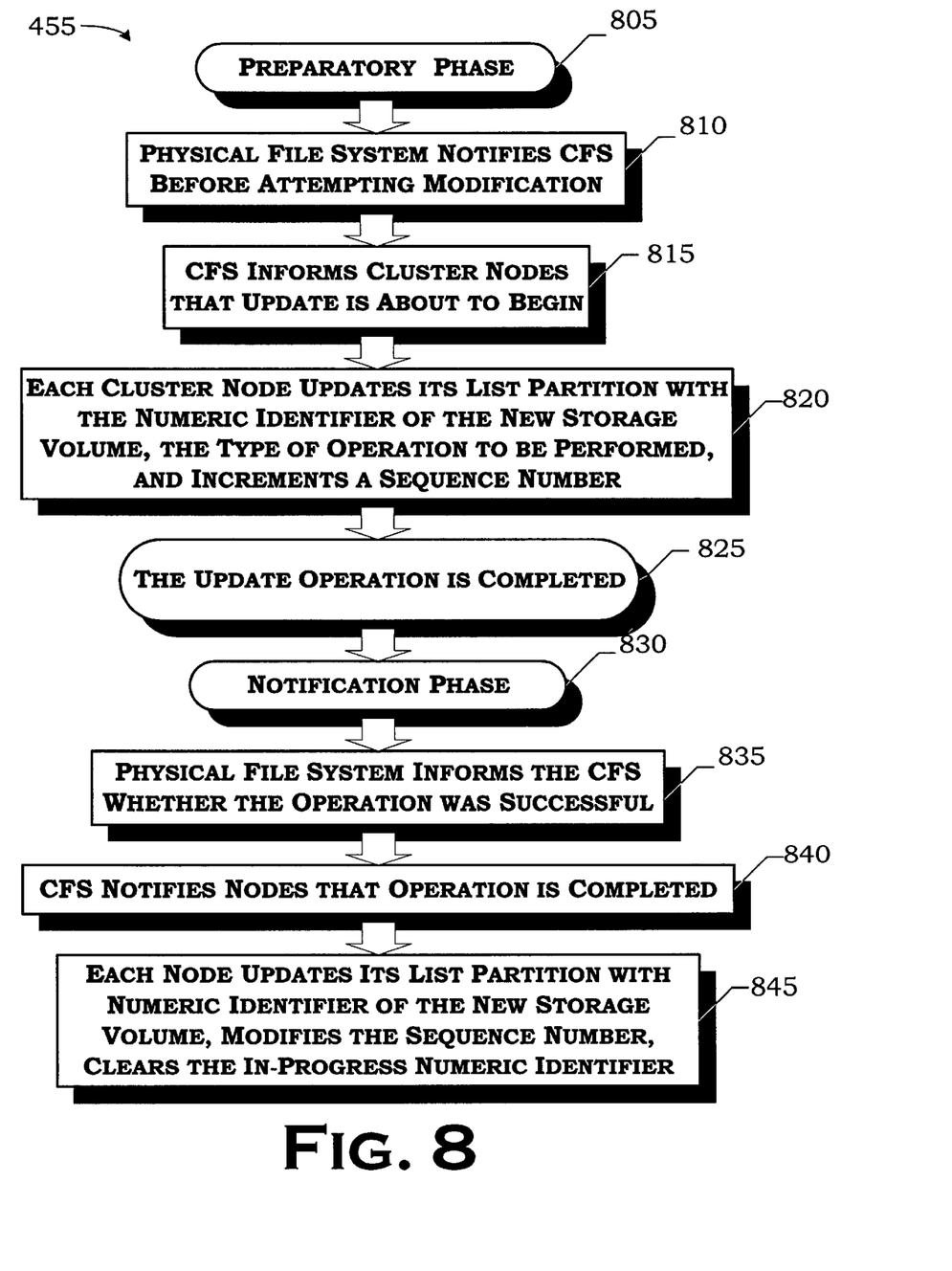

Returning, to FIG. 4 and now referring to FIG. 7 and FIG. 8, the method 400 continues by modifying the cluster root file system storage, as set forth in the box 430. In the illustrated embodiment, the modification is the addition of a storage volume to the cluster root file system, but could just as easily be the removal of a storage volume. The disk 700 comprises the storage volume to be added. In this particular embodiment, the disk 700 is a second disk in the server 520 of the node 510, but is likely to be attached to multiple nodes in the cluster. The modification begins with the generation of a modification request from within the cluster. The modification is implemented responsive to this request using a two-phase commit, as set forth in the box 435 and as is discussed further below. Once the modification is made, the lists are updated on all cluster nodes, as set forth in the terminator 440, with what the physical file system concludes to be the viable storage volumes in the cluster root file system.

The two-phase commit of the box 435 is shown in greater detail in FIG. 8. The two-phase commit begins with its preparatory phase, as set forth in the terminator 805. Prior to the preparatory phase, the request to modify is generated, as set forth in the box 430 of FIG. 4, and is intercepted by the cluster root file system within the kernel 550 in the following manner. In the preparatory phase, the underlying physical file system notifies the CFS upon receiving the request to modify the storage, as set forth in the box 810, before implementing the request. The CFS then informs the cluster nodes that the update is about to begin, as set forth in the box 815. Each cluster node then updates its list partition 810 on its boot disk 800 with the in-progress numeric identifier of the new storage element (e.g., the dev_t in one particular embodiment), the type of operation to be performed (i.e., addition or deletion of a storage volume), and increments a sequence number, as set forth in the box 820. The update operation is completed, as set forth in the terminator 825, and the physical file system then attempts to mount the new storage volume as part of the cluster root file system.

Once the physical file system is through, the notification phase begins, as set forth in the terminator 830. The physical file system informs the CFS whether the operation was successful, as set forth in the box 835, whereupon the CFS notifies the cluster nodes whether the operation was successfully completed, as set forth in the box 840. Each of the cluster nodes the updates its list of cluster root file system storage volumes and modifies its sequence number, typically by incrementing it, as set forth in the box 845. Note that this two-phase commit is equally applicable to the removal of storage volumes from the cluster root file system. In this case, the update to the lists in the list partitions 810 of the boot disks 800 is to delete the identity of the removed volume. Otherwise, the two-phase commit is the same as is disclosed in FIG. 8.

This two phase commit procedure ensures that, if the node performing the operation or the entire cluster were to fail in the middle of the operation, a subsequent reboot would detect that there was an operation in progress. Furthermore, the subsequent reboot would be able to: (1) inform the underlying physical file system of the storage volumes which comprise the file system, and (2) indicate that there was an add or remove volume operation in progress and the storage volume which was being acted on. Having all of this information, the physical file system is then able to determine whether the addition or removal completed successfully or not and if not it is able to determine which storage volume was being acted upon at the time and act appropriately.

The method 400 then repeats the process beginning at the terminator 425 whenever cluster root file system capacity is changed, ie., when a user requests to have storage added to or removed from the cluster root file system. Eventually, a clustered computing system may be obtained in which each cluster node stores a list of all storage volumes containing the cluster root file system in a list partition of a boot disk. In the course of obtaining this clustered computing system, each cluster node is able to check at the entry of boot into the cluster to make sure they have the most up-to-date information and will update it appropriately. The two-phase commit may also be used in the removal of storage volumes in an analogous manner. Thus, the present invention provides a technique for supporting multi-volume root node file systems in clustered computing systems.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for supporting multiple storage volumes in a cluster root file system, comprising:

maintaining a list of storage volumes containing the cluster root file system in a list partition of a boot disk for each one of a plurality of cluster nodes;

modifying the cluster root file system storage; and updating each list of the storage volumes containing the cluster root file system to reflect the modification.

2. The method of claim 1, wherein modifying the cluster root file system includes:

preparing each cluster node for the commencement of the update operation, including storing the nature of the update operation, an indication that the update operation is about to commence, and an identifier for a storage volume to be modified;

modifying the identified volume; and modifying each indication that the update operation is about to commence to indicate that the update operation has been completed.

3. The method of claim 2, wherein modifying each indication that the update operation is about to commence to indicate that the update operation has been completed includes:

calling into the cluster file system to inform the cluster file system of whether the update operation was successful; and informing each node of the cluster of the success of the update operation.

4. The method of claim 2, wherein preparing each cluster node comprises:

notifying each cluster node that the update operation is about to occur; and updating the list partition of the boot disk for each cluster node.

5. The method of claim 2, further comprising updating each storage volume list upon being informed of the completion of the update operation.

6. The method of claim 1, wherein modifying the cluster root file system includes adding a storage volume.

7. The method of claim 1, further comprising adding a new node to the cluster.

8. The method of claim 7, further comprising updating a corresponding list partition of a boot disk for each cluster node in the cluster file system, including the one from which the plurality of cluster storage volume identities are copied, with the storage volume identity once the non-cluster node is booted.

9. The method of claim 1, further comprising utilizing a sequence number mechanism to detect a node failure.

10. The method of claim 9, wherein utilizing a sequence number mechanism to detect a node failure further includes:

modifying the sequence number during a preparatory phase of an update operation performed on a corresponding list partition of a boot disk for each cluster node in the cluster; and modifying the sequence number during a notification phase of an update phase of the update operation; and at least one of:

determining on cluster file system server failover of the cluster root file system whether there was a node failure during the update operation from the sequence number; and determining on reboot of the entire cluster whether there was a node failure during the update operation from the sequence number.

11. The method of claim 9, further comprising:

comparing the sequence number with a corresponding sequence number of a cluster node when booting into a cluster; and updating the storage volume list on the booting node's list partition on its boot disk.

12. A program storage medium encoded with instructions that, when executed by a computer, perform a method for supporting multiple storage volumes in a cluster root file system, the method comprising:

maintaining a list of storage volumes containing the cluster root file system in a list partition of a boot disk for each one of a plurality of cluster nodes;

modifying the cluster root file system storage; and updating each list of the storage volumes containing the cluster root file system to reflect the modification.

13. The program storage medium of claim 12, wherein modifying the cluster root file system in the encoded method includes:

preparing each cluster node for the commencement of the update operation, including storing the nature of the update operation, an indication that the update operation is about to commence, and an identifier for a storage volume to be modified;

modifying the identified volume; and modifying each indication that the update operation is about to commence to indicate that the update operation has been completed.

14. The program storage medium of claim 13, wherein modifying each indication that the update operation is about to commence to indicate that the update operation has been completed in the encoded method includes:

calling into the cluster file system to inform the cluster file system of whether the update operation was successful; and informing each node of the cluster of the success of the update operation.

15. The program storage medium of claim 13, wherein preparing each cluster node in the encoded method comprises:

notifying each cluster node that the update operation is about to occur; and updating the list partition of the boot disk for each cluster node.

16. The program storage medium of claim 13, wherein the encoded method further comprises updating each storage volume list upon being informed of the completion of the update operation.

17. The program storage medium of claim 12, wherein modifying the cluster root file system in the encoded method includes adding a storage volume.

18. The program storage medium of claim 12, wherein the encoded method further comprises adding a new node to the cluster.

19. The program storage medium of claim 18, wherein the encoded method further comprises updating a corresponding list partition of a boot disk for each cluster node in the cluster file system, including the one from which the plurality of cluster storage volume identities are copied, with the storage volume identity once the non-cluster node is booted.

20. The program storage medium of claim 12, wherein the encoded method further comprises utilizing a sequence number mechanism to detect a node failure.

21. The program storage medium of claim 20, wherein utilizing a sequence number mechanism to detect a node failure further in the encoded method includes:

modifying the sequence number during a preparatory phase of an update operation performed on a corresponding list partition of a boot disk for each cluster node in the cluster; and modifying the sequence number during a notification phase of an update phase of the update operation; and at least one of:

determining on cluster file system server failover of the cluster root file system whether there was a node failure during the update operation from the sequence number; and determining on reboot of the entire cluster whether there was a node failure during the update operation from the sequence number.

22. The program storage medium of claim 21, wherein the encoded method further comprises:

comparing the sequence number with a corresponding sequence number of a cluster node when booting into a cluster; and updating the storage volume list on the booting node's list partition on its boot disk.

23. A computing device programmed to perform a method for supporting multiple storage volumes in a cluster root file system, the method comprising:

maintaining a list of storage volumes containing the cluster root file system in a list partition of a boot disk for each one of a plurality of cluster nodes;

modifying the cluster root file system storage; and updating each list of the storage volumes containing the cluster root file system to reflect the modification.

24. The programmed computing device of claim 23, wherein modifying the cluster root file system in the programmed method includes:

preparing each cluster node for the commencement of the update operation, including storing the nature of the update operation, an indication that the update operation is about to commence, and an identifier for a storage volume to be modified;

modifying the identified volume; and modifying each indication that the update operation is about to commence to indicate that the update operation has been completed.

25. The programmed computing device of claim 24, wherein modifying each indication that the update operation is about to commence to indicate that the update operation has been completed in the programmed method includes:

calling into the cluster file system to inform the cluster file system of whether the update operation was successful; and informing each node of the cluster of the success of the update operation.

26. The programmed computing device of claim 24, wherein preparing each cluster node in the programmed method comprises:

notifying each cluster node that the update operation is about to occur; and updating the list partition of the boot disk for each cluster node.

27. The programmed computing device of claim 24, wherein the programmed method further comprises updating each storage volume list upon being informed of the completion of the update operation.

28. The programmed computing device of claim 23, wherein modifying the cluster root file system in the programmed method includes adding a storage volume.

29. The programmed computing device of claim 23, wherein the programmed method further comprises adding a new node to the cluster.

30. The programmed computing device of claim 29, wherein the programmed method further comprises updating a corresponding list partition of a boot disk for each cluster node in the cluster file system, including the one from which the plurality of cluster storage volume identities are copied, with the storage volume identity once the non-cluster node is booted.

31. The programmed computing device of claim 23, wherein the programmed method further comprises utilizing a sequence number mechanism to detect a node failure.

32. The programmed computing device of claim 31, wherein utilizing a sequence number mechanism to detect a node failure further in the programmed method includes:

modifying the sequence number during a preparatory phase of an update operation performed on a corresponding list partition of a boot disk for each cluster node in the cluster; and modifying the sequence number during a notification phase of an update phase of the update operation; and at least one of:

determining on cluster file system server failover of the cluster root file system whether there was a node failure during the update operation from the sequence number; and determining on reboot of the entire cluster whether there was a node failure during the update operation from the sequence number.

33. The programmed computing device of claim 32, wherein the programmed method further comprises:

comparing the sequence number with a corresponding sequence number of a cluster node when booting into a cluster; and updating the storage volume list on the booting node's list partition on its boot disk.

* * * * *